UNITED STATES PATENT OFFICE.

AAGE GUSMER, OF WEST END, NEW JERSEY.

PROCESS OF CLARIFYING FRUIT JUICES. REISSUED 1,406,554. Specification of Letters Patent. Patented Feb. 14, 1922.

No Drawing. Application filed November 17, 1920, Serial No. 424,616. Renewed December 24, 1921.
Serial No. 524,742.

*To all whom it may concern:*

Be it known that I, AAGE GUSMER, a subject of the King of Denmark, and a resident of West End, in the county of Essex and State of New Jersey, have invented new and useful Improvements in Processes of Clarifying Fruit Juices, of which the following is a description.

This invention relates to an improved process for clarifying fruit juices and more particularly comprehends a simple and effective process for effecting the removal of starchy matters from pectose liquors.

Since the advent of prohibition, it has been the aim and purpose of scientists to provide processes for the manufacture of non-alcoholic beverages wherein the inversion of the starch constituents is interrupted and not carried out to a finality at which stage the starch has been converted into dextrose or maltose, depending upon the nature of the enzyme which may have been used. In either of these forms the dextrose or maltose is fermentable. In the first stage of starch inversion erythrodextrin is produced and in the next stage of inversion the starch is in the form of dextrin. Dextrin is not fermentable and therefore it is desirable to stop the process of inversion at this point when the dextrin is completely soluble in the liquor. The dextrin is valuable as a non-fermentable body for the beverage and because of its highly palatable quality. It is most desirable in pectose liquors because it does not greatly tend to harden the same as does dextrose or maltose.

When processing starchy liquors without the presence of a diastatic enzyme, the starch becomes pasty and holds turbid matters in suspension, and thus greatly retards or practically renders filtration impossible. It is well known that the starch combines with tannic acids in fruit juices and forms a starch tannate. This however does not cause turbidity in the juices so long as the same are hot, but after the juices or resulting jelly cools down it is rendered quite turbid by the presence of the starch tannate therein.

I have found, that this desirable interruption of the process of inversion of starch into sugar and the maintenance of the starch in the form of dextrin during the processing operation may be produced by the use of a non-malt diastatic enzyme consisting of a comminuted fungi growth of the genus Aspergillus, or genera Mucor and Pennecillium, or of the fungus Eurotium Oryzæ (Ahlburg). I have also found it possible to use the fungi amylomyces Roxii. The two fungi first above mentioned are distinguishable from yeast fungi of which the latter is an example, in that they are characterized by the presence of mycelium (antennæ or pencils) whereas the yeast fungi does not grow such mycelium. Furthermore, the fungi referred to has a distinct diastatic action without alcoholic fermentation in the form in which I propose to use the same. The fungi which I employ is commercially known as "polyzyme L" and is produced in the manner described in U. S. Patent 525,823 granted to Jokichi Takamine, September 11, 1894.

In the practice of my improved process I first produce an extract consisting of substantially 300 gallons of either hot or cold water to 150 pounds of fruit pulp, such extract being heated to from 110 to 130 degrees F. but preferably maintained at a temperature of about 120 degrees F. As is well known, fruit pomace such as the crushed apples resulting from the making of cider is sold in large quantities to jelly manufacturers from which an apple jelly is produced. In pressing the juice from the apples, practically all of the saccharinous matters are removed, this juice being principally used in the production of cider vinegar. However, it is possible to use grapes and various other fruits in the production of the extract above referred to. To this extract either with or without the addition of acid, depending upon the natural acid of the fruit I add 40 pounds of the fungi "polyzyme L".

This fungi is grown upon wheat bran. I first divide the fungi into finely comminuted form and thoroughly distribute the same through the liquid extract by continuously stirring or agitating the same for from one to one and one-half hours. This stirring or agitating results in the creation of a uniform distribution of the fungi throughout the extract so that it comes into intimate relation to the starchy matters therein and starts the process of inversion. Due to the fact that the flaky particles of bran are quite porous as well as very light, the liquid will pass through each bran particle as it rises through the extract towards the surface thereof. The mechanical agitation of the extract keeps the bran particles in constant motion so that they are not permitted to collect upon the surface of the extract, and these bran particles thus greatly amplify the agitation of the liquid and accelerate the inversion of the starch. The use of the fungi in dry or solid form is a very important feature of my invention as I am thus enabled to reduce the quantity of the fungi required over that which is necessary when a solution of extract is first formed from the fungi as has heretofore been the case.

When a sample of the extract filters bright through filter paper by the well known iodin test and does not show a blue or purple reaction indicating the presence of starch or erythrodextrin, the temperature of the extract is quickly increased to 150 degrees F. During the increase of temperature from 120 to 150 degrees, the extract is pasteurized and all bacteria therein are killed. Furthermore fermentation which would destroy the pectin is effectually prevented. This high temperature also results in the immediate destruction of the enzyme so that it loses its diastatic powers. The process of inversion of the starch therefore ceases and it is not inverted into the form of dextrose or sugar, at which point fermentation would occur, or hardening or jellification set in if the juice is concentrated.

A filtration can now easly take place with or without previous straining, the result being a brilliant liquid which does not get turbid when cold. If desired the clarified extract may be concentrated in vacuo to any desired density. Thus it will be seen that by means of the present improved process I am enabled to produce a fruit extract from fruits of various kinds wherein all pectose matters and the inverted starch in the form of dextrine will be retained but which extract is practically devoid of the natural sugar of the fruits and likewise of the original starch constituents thereof. Since I do not employ a malt diastase or other enzyme which would produce fermentation, the resultant product will be absolutely non-alcoholic when otherwise treated, asceptic. In the concentrated form of the product, all of the pectin in the original extract is retained so that the concentrate when added simply to sugar and water will produce a perfectly clear and absolutely transparent non-turbid jelly having the flavor of the original fruit. In a condition of greater fluidity, the resultant product may be marketed as a beverage which will be absolutely free of an alcoholic content.

I claim:

1. A process of clarifying starch containing liquors which consists in adding a non-malt diastatic enzyme to the liquor to establish the process of starch inversion and destroying the enzyme and interrupting the process of starch inversion when the starch has been inverted into dextrin.

2. A process of clarifying starch containing liquors which consists in adding a fungi to the liquor having a non-malt diastatic reaction with the starch to invert the latter, and destroying the fungi to interrupt the diastatic reaction and the process of inversion when the starch has been inverted into dextrin.

3. A process of clarifying starch containing liquors which consists in adding a non-malt diastatic fungi in solid comminuted form to the liquor to establish the process of starch inversion, continuously agitating the liquor during the inversion of the starch and destroying the fungi and interrupting the process of starch inversion when the starch has been inverted into dextrin.

4. A process of clarifying starch containing liquors which consists in adding a non-malt diastatic fungi to the liquor at a temperature of approximately 120 degrees F. to establish the process of starch inversion, maintaining the liquor at such temperature and under constant agitation until a sample of the liquor fails to show a starch reaction by the iodin test and then increasing the temperature of the liquor to destroy the diastatic power of the fungi and interrupt the process of starch inversion.

5. A process of clarifying starch containing liquors which consists in adding a non-malt diastatic fungi in solid form to the liquor at a temperature of approximately 120 degrees F., maintaining the liquor under constant agitation until the starch is inverted into dextrin and then increasing the temperature of the liquor to approximately 150 degrees F., to destroy the fungi and interrupt the process of starch inversion.

6. A process of clarifying fruit juices which consists in adding to the fruit juices a non-malt diastatic enzyme in solid form to establish the process of starch inversion, destroying the enzyme when the starch is inverted into dextrin and thereby interrupting the process of starch inversion and then filtering the liquor to remove the solids therefrom.

7. A process of clarifying fruit juices which consists in adding to the fruit juices a non-malt diastatic enzyme in solid form to establish the process of starch inversion, destroying the enzyme when the starch is inverted into dextrin and thereby interrupting the process of starch inversion, then filtering the liquor to remove the solids therefrom, and finally evaporating the juices in vacuo to the form of a concentrate.

8. A process of clarifying fruit juices which consists in adding to the juices at a temperature of approximately 120 degrees F.

a non-malt diastatic fungi in comminuted solid form to establish the process of starch inversion, maintaining the juices under constant agitation until a sample fails to show a starch reaction by the iodin test, and then increasing the temperature of the juices to approximately 150 degrees F. to destroy the diastatic power of the fungi and interrupt the process of inversion.

9. The process of clarifying fruit juices which consists in adding to the fruit juices a non-malt diastatic enzyme in the form of separate flaky porous particles, mechanically agitating the fruit juices to incessantly move the flaky particles therein and accelerate the process of starch inversion by diastatic action, and destroying the enzyme when the starch is inverted into dextrin and thereby interrupting the process of starch inversion.

10. A process of clarifying fruit juices which consists in adding to the fruit juices at a temperature of approximately 120 degrees F., a non-malt diastatic fungi in the form of separate porous flaky particles, agitating the fruit juices to incessantly move the flaky particles of the fungi therethrough and accelerate the process of starch inversion by diastatic action until a sample of the juices when subjected to the iodin test fails to show a blue or purple reaction, then raising the temperature of the juices to approximately 150 degrees F. to destroy the diastatic power of the fungi and interrupting the process of starch inversion with the starch in solution in the form of dextrin.

In testimony that he claims the foregoing as his invention, he has signed his name.

AAGE GUSMER.